(12) United States Patent
Coddington et al.

(10) Patent No.: US 10,481,265 B2
(45) Date of Patent: Nov. 19, 2019

(54) APPARATUS, SYSTEMS AND METHODS FOR POINT CLOUD GENERATION AND CONSTANTLY TRACKING POSITION

(71) Applicant: Robotic paradigm Systems LLC, Huntsville, AL (US)

(72) Inventors: Timothy Coddington, Huntsville, AL (US); Lynn Coddington Gilbert, Marietta, GA (US)

( * ) Notice: Subject to any disclaimer, the term of this patent is extended or adjusted under 35 U.S.C. 154(b) by 485 days.

(21) Appl. No.: 15/405,304

(22) Filed: Jan. 12, 2017

(65) Prior Publication Data

US 2017/0123066 A1 May 4, 2017

Related U.S. Application Data

(63) Continuation-in-part of application No. 13/723,698, filed on Dec. 21, 2012, now abandoned.

(60) Provisional application No. 61/578,375, filed on Dec. 21, 2011.

(51) Int. Cl.
| | |
|---|---|
| *G01S 17/00* | (2006.01) |
| *G01S 17/87* | (2006.01) |
| *G01S 17/42* | (2006.01) |
| *G01S 7/481* | (2006.01) |
| *G01S 17/02* | (2006.01) |
| *G01S 17/50* | (2006.01) |
| *G01S 17/89* | (2006.01) |
| *G01C 15/00* | (2006.01) |

(52) U.S. Cl.
CPC .......... *G01S 17/875* (2013.01); *G01C 15/002* (2013.01); *G01S 7/4817* (2013.01); *G01S 17/023* (2013.01); *G01S 17/42* (2013.01); *G01S 17/50* (2013.01); *G01S 17/89* (2013.01)

(58) Field of Classification Search
USPC ............................................ 356/4.01, 5.01
See application file for complete search history.

(56) References Cited

U.S. PATENT DOCUMENTS

| | | | | |
|---|---|---|---|---|
| 5,337,149 A * | 8/1994 | Kozah | .................. | G01C 15/002 356/139.03 |
| 5,440,492 A * | 8/1995 | Kozah | .................... | G01B 7/004 701/501 |
| 6,683,694 B2 * | 1/2004 | Cornil | .................. | G01C 15/002 356/4.01 |
| 6,917,893 B2 * | 7/2005 | Dietsch | ................ | G01C 15/002 702/150 |
| 7,287,701 B2 * | 10/2007 | Miller | .................. | G01S 17/023 235/472.01 |

(Continued)

*Primary Examiner* — James R Hulka
(74) *Attorney, Agent, or Firm* — Patent Grove, LLC; Tomas Friend

(57) ABSTRACT

A system having a range-finding laser device (RFLD) is configured to be coupled to an operator performs scans producing range and angle data points on surrounding structures. An attitude inertial measuring unit (IMU) attached to the RFLD measures pitch and roll of the RFLD and at least one zero-velocity update (zupt) IMU coupled to the operator is used to estimate the position, velocity and yaw of the operator. The system has computer logic that transforms data points from sensor frames of reference to a global frame of reference and merges transformed data points in a point cloud that can be used to generate images of scanned environments on a display.

20 Claims, 12 Drawing Sheets

(56) References Cited

U.S. PATENT DOCUMENTS

| | | | | |
|---|---|---|---|---|
| 7,302,359 | B2* | 11/2007 | McKitterick | G01C 7/06 340/990 |
| 7,516,039 | B2* | 4/2009 | McKitterick | G01C 7/06 180/116 |
| 7,541,974 | B2* | 6/2009 | Scherzinger | G01C 15/00 342/357.32 |
| 7,860,301 | B2* | 12/2010 | Se | G01C 11/06 348/43 |
| 8,072,581 | B1* | 12/2011 | Breiholz | G01S 7/51 356/4.01 |
| 9,008,998 | B2* | 4/2015 | Canter | G06K 9/00691 702/150 |
| 9,146,315 | B2* | 9/2015 | Bosse | G01S 17/08 |
| 2003/0043058 | A1* | 3/2003 | Jamieson | G01C 23/005 340/961 |
| 2003/0086096 | A1* | 5/2003 | Cornil | G01C 15/002 356/627 |
| 2003/0176986 | A1* | 9/2003 | Dietsch | G01C 15/002 702/150 |
| 2004/0122628 | A1* | 6/2004 | Laurie | G01C 15/00 703/1 |
| 2006/0180648 | A1* | 8/2006 | Miller | G01S 17/023 235/375 |
| 2006/0221072 | A1* | 10/2006 | Se | G01C 11/06 345/420 |
| 2007/0139262 | A1* | 6/2007 | Scherzinger | G01C 15/00 342/357.32 |
| 2007/0185681 | A1* | 8/2007 | McKitterick | G01C 7/06 702/159 |
| 2008/0040071 | A1* | 2/2008 | McKitterick | G01C 7/06 702/159 |
| 2008/0238772 | A1* | 10/2008 | Soloviev | G01S 19/22 342/357.25 |
| 2009/0262974 | A1* | 10/2009 | Lithopoulos | G06T 7/73 382/100 |
| 2011/0282622 | A1* | 11/2011 | Canter | G06K 9/00691 702/150 |
| 2012/0320372 | A1* | 12/2012 | Troy | G01N 29/043 356/237.2 |
| 2013/0120736 | A1* | 5/2013 | Bosse | G01S 17/08 356/4.01 |
| 2013/0179119 | A1* | 7/2013 | Coddington | G01C 3/08 702/159 |
| 2015/0241562 | A1* | 8/2015 | Goldberg | G01S 17/42 356/3.11 |
| 2015/0258990 | A1* | 9/2015 | Stettner | G01S 17/023 701/37 |
| 2016/0047896 | A1* | 2/2016 | Dussan | G01S 7/484 356/4.01 |
| 2016/0047903 | A1* | 2/2016 | Dussan | G01S 7/484 356/5.01 |

* cited by examiner

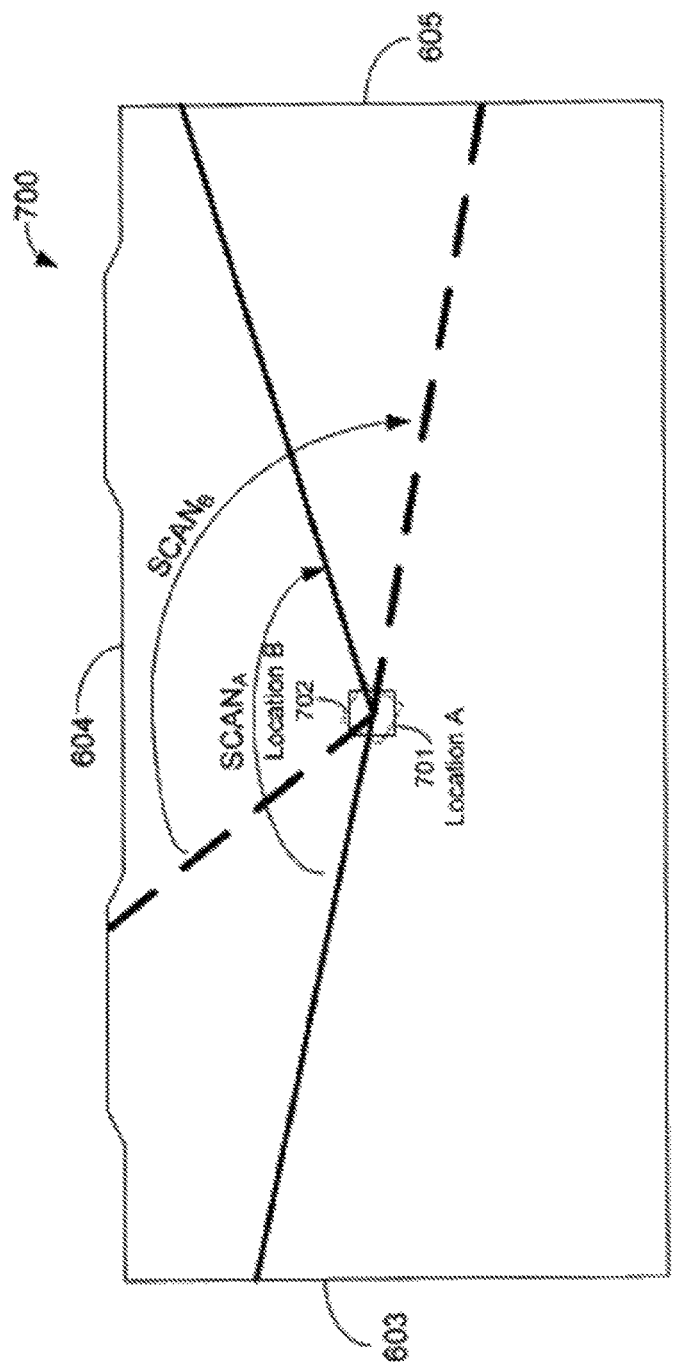
FIG. 8A
FIG. 8C
FIG. 8B

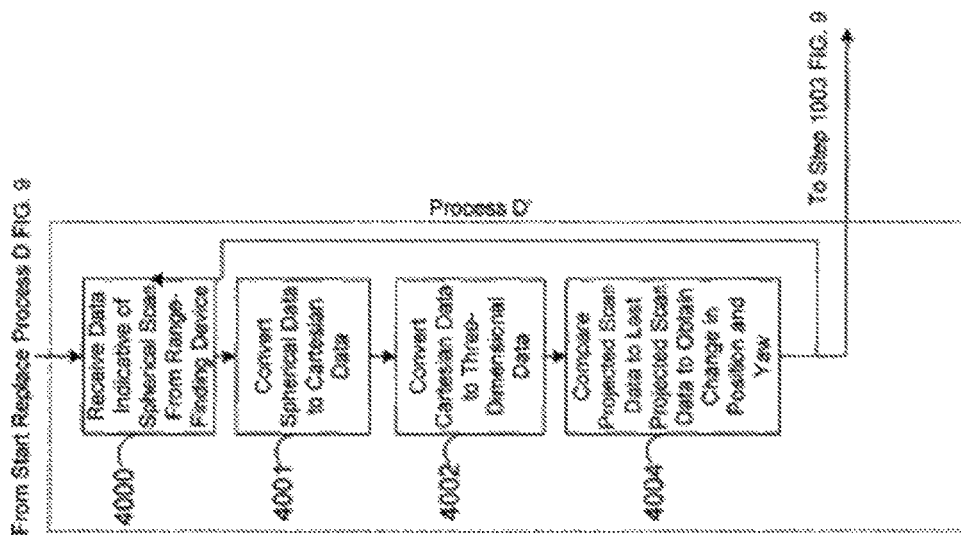

APPARATUS, SYSTEMS AND METHODS FOR POINT CLOUD GENERATION AND CONSTANTLY TRACKING POSITION

CROSS-REFERENCE TO RELATED APPLICATIONS

This application is a Continuation-in-Part of U.S. application Ser. No. 13/723,698 filed Dec. 21, 2012, which claims priority to U.S. Provisional Application Ser. No. 61/578,375 filed Dec. 21, 2011, both of which are incorporated herein by reference in their entirety.

BACKGROUND OF THE INVENTION

Field of the Invention

The present invention relates to the collection of data from range-finding laser devices (RFLDs), such as those used for Light Detection and Ranging (LIDAR) applications, to generate point clouds capable of creating maps of and/or within structures. The present invention additionally relates to accurately tracking the position of a RFLD using a Simultaneous Localization and Mapping (SLAM) process. The invention relates to apparatus, systems, and methods for collecting and processing RFLD data to generate a map image and to apparatus, systems, and methods for tracking the position of a RFLD device.

Description of Related Art

Light Detection and Ranging (LIDAR) is often used to measure the distances of objects from a LIDAR range-finding laser device (RFLD). In such applications, the RFLD emits laser pulses, and a detector positioned on or near the RFLD detects reflections of the laser pulses from objects around the RFLD. The travel time from the time when each pulse is emitted to the time when the reflection from that pulse is detected is used to calculate the distance of the point on the object from which the laser pulse is reflected.

When used for mapping an area surrounding the RFLD, a LIDAR system typically uses data from a Global Positioning System (GPS) to track the precise location of the LIDAR system. The precise location of the RFLD is necessary, for example, if data from the RFLD is moved and used to create an image or digital map of the surroundings of the RFLD over time as the RFLD is moved. A difficulty arises, however, when LIDAR is to be used in this way where GPS signals are not available. Locations where GPS signals are normally not available include the interiors of buildings, caves, and wherever physical objects or electromagnetic fields block or interfere with GPS signals.

One type of solution to the problem LIDAR mapping without GPS involves the pavement of transmitters, receivers, reflectors, or other location markers at known locations in the environment or structure being mapped. This allows communicating with receivers, transmitters, or sensors on a range-finding device that allow the position of the LIDAR system to be triangulated or otherwise calculated. This type of solution is not satisfactory for many applications, however, because the positioning of markers at precisely known locations is time consuming and, for large or complex structures, may require very large numbers of transmitters.

US 2007/0185681 A1 describes a system and method for mapping a room without GPS. The system includes a rangefinder, an inertial sensor on the rangefinder, and a processor coupled the rangefinder and the inertial sensor. The processor produces a virtual room reconstruction based on a set of range measurements from the rangefinder and inertial measurements from an inertial sensor. The system is used to map a building by repeating a two-step process in which a range-finder measures the distance to one or more walls while information about the attitude and position of the range-finder is obtained from a six-axis inertial sensor attached to the range-finder. The accuracy of this system and method is limited, however, in part because errors in determining the position of the range-finder accumulate quickly over time. This, in turn, limits the accuracy of a map resulting from the incorporation of inaccurate position data by the processor.

U.S. Pat. No. 7,991,576 B2 describes an indoor navigation system and method that includes generating an attitude estimate of a cane, determining the heading direction, and determining a position of the person holding the cane. The attitude (pitch, roll, yaw) of the cane is estimated using a 3-axis gyroscope and laser-scan measurements of structural planes in the building. Heading is extracted from a yaw component of the cane's attitude estimate and provides a heading measurement to a position filter. The position of the person is estimated using heading estimates, linear velocity measurements from a pedometer, and relative coordinates of known corner features detected by the laser scanner. A laser scanner is used to detect corners for which the locations have been determined in advance. One significant limitation of this system and method is that the corner features required for the method must be known a priori from building blueprints or from another source, which limits their use to locations for which maps, blueprints, or other detailed position data is available. Additionally, the transfer of coordinates for known features into the system is required for each location in which the cane is to be used.

US 2013/0120736 A1 describes a method and a three-dimensional (3D) scanning device with a reactive linkage mechanism that are used to collected data that can be used for generating a point cloud. The process involves a data association hat identifies a common feature detected by a laser scanner at two different positions, or poses, that identify two surfaces of the common feature. A system of constraints is formed that links feature matches to corrections applied to the pose of the laser scanner. A registration algorithm is used to project range measurements into a non-registered 3D point cloud. A function specifying a six degree of freedom pose of the laser scanner with respect to a ground coordinate frame is used to determine a trajectory of the scanner. A workspace of the environment is discretized into a 3D grid of volume elements and statistics are computed for each voxel based on the set of scan points that fall within its boundaries. To account for non-uniform sampling of the environment and boundary effects, 3D grids are computed at multiple resolutions and offsets. An iterative optimization algorithm is then used to estimate the scanner trajectory and register the point cloud to produce an accurate 3D map. This process requires significant computing power and does not provide the speed or accuracy of systems using markers of known reference locations.

Simultaneous Localization and Mapping (SLAM) involves building, extending and improving a map of the surroundings of a moving robot and simultaneously determining the location of the robot with respect to the map. As a robot moves through a structure for which the robot has no defined map or known landmarks, a SLAM process can be used to calculate the estimated pose of the robot from measured headings and odometer readings. SLAM systems typically include inertial measurement units (IMUS) or other sensors to track position and orientation, or pose. Unfortunately, the accuracy of the pose calculated in this way is limited because of an accumulation of relatively small errors over time that result in large errors in the calculated pose.

Existing technologies and services for capturing data and rendering a layout of a building interior are relatively expensive or slow or both. Technologies that provide very accurate results are expensive and slow. Many are too bulky or fragile to be portable and the techniques have not been developed that support localizing, or determining the position of the equipment as it moves. Scanning large volume areas such as millions of square feet in 6-10 hours at a reasonable cost is currently not possible. Existing systems provides high resolution scanning technology that is either placed in a sequence of fixed locations or slowly moved on a cart at a constant speed. In both cases, the scanning process is time consuming and a fixed or limited height of scanning limits coverage. In the case of a moving cart, obstacles such as office cubicles have to be navigated to expose all interior spaces to the laser scan, which also slows the process.

Thus, a need remains in the art for a mapping system and method capable of accurately mapping structures, preferably in real time, without the use of GPS or the need for marking known locations with positional markers.

BRIEF SUMMARY OF THE INVENTION

The present invention fills a need in the art for apparatus, systems, and methods that can independently track the pose of an RFLD and for apparatus, systems, and methods that can produce point clouds from RFLD to generate maps of structures. The apparatus, systems may be self-contained to perform the methods independently. The apparatus, systems, and methods may operate in real time to provide a pose and/or an image representing point cloud data. These are made possible, in part, by the ability of the apparatus, systems, and methods to compare scan data from a current, or most recent, scan with a preceding scan to derive an estimated change in the pose of RFLD from the preceding scan to the current scan using a scan matching method. The apparatus, systems, and methods are additionally able to calculate a current, or latest, global pose of the RFLD based upon the change in position of the RFLD.

The presently described system and method overcomes the limitations of existing systems to collect accurate scans of indoor spaces that cover large areas in a relatively short time and at a reasonable cost. The system self-contained and is relatively small and lightweight compared to existing systems and enabled rapid movement through interior spaces during scan data collection. Furthermore, the system comprises a scanning device that can be raised or lowered as needed to accommodate obstructions. In addition, digital, video, and audio information may be collected during scanning and may be used to generate data that can be post processed into many useful forms, including floor plans and physical layouts. The results may include graphical renderings of spaces that can be inserted into many types of multi-media, such as smart phones, and web browsers.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which:

FIG. 8A is a top view of the structure shown in FIG. 7;

FIGS. 8B, C illustrate examples of rendered scan data collected for first and second scans of the structure shown in FIG. 7;

FIG. 10 is a flowchart illustrating optional method steps that may be used ind edition to or as an alternative to the method shown in FIG. 9.

DETAILED DESCRIPTION OF THE INVENTION

Figure 1:
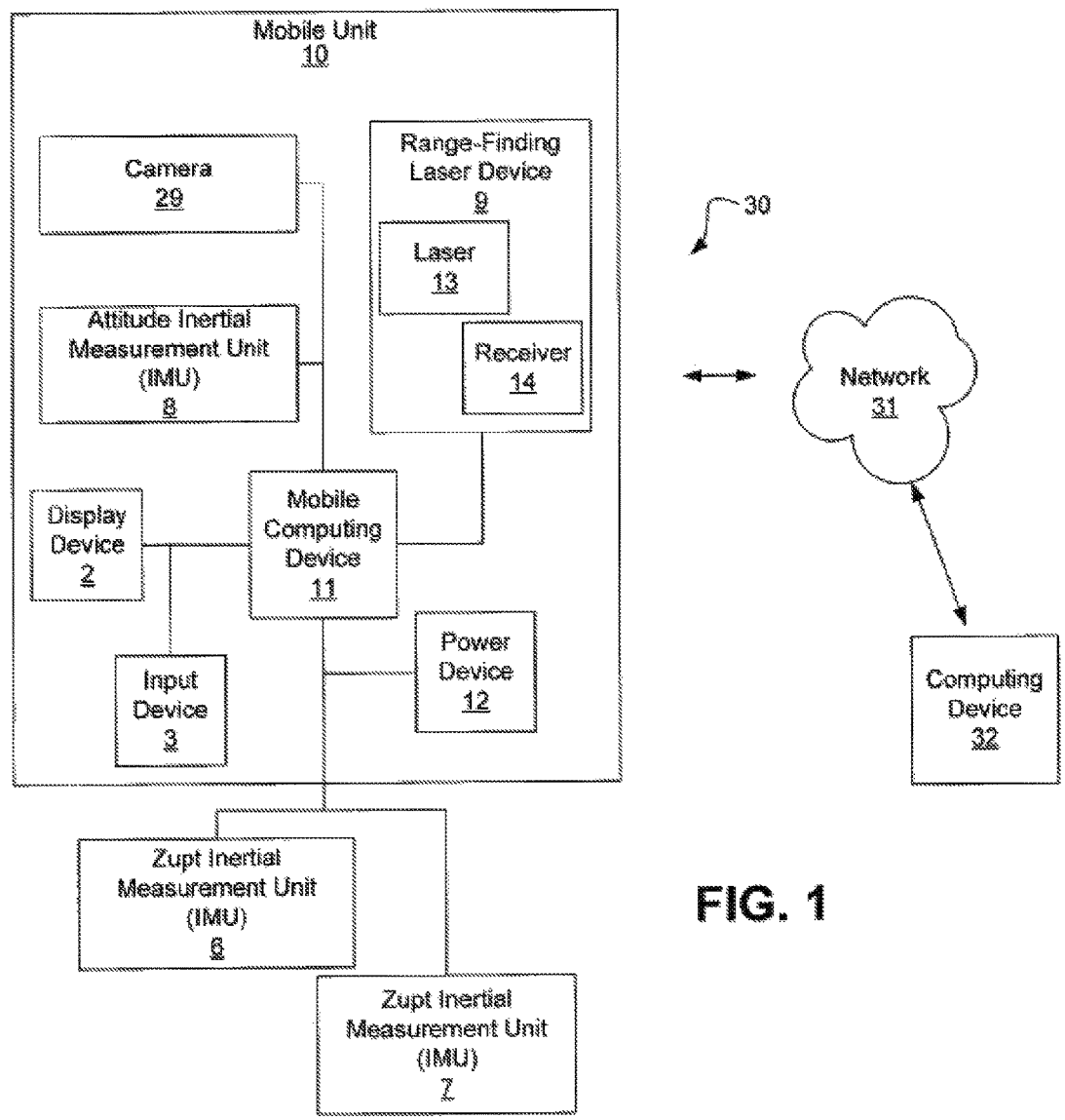
FIG. 1 is a block diagram illustrating a data collection and point cloud generation system in accordance with an embodiment of the present invention.

All art specific terms used herein are intended to have their art-accepted meanings in the context of the description unless otherwise indicated. All non art specific terms are intended to have their plain language meaning in the context of the description unless otherwise indicated.

As used herein, the "pose" of an object refers the the position and orientation of the object in space at a given time. The position of the object may be described using a coordinate system, such as a Cartesian coordinate system. The orientation may be described, for example, in terms of pitch, roll, and yaw.

An incremental scan matcher pose is derived through a scan matching process, where successive laser scans are compared using a pattern matching or scan matching technique and the difference in orientation and position offset are computed. The difference is known as the change in pose, or incremental pose.

A point cloud is a set of information that represents Cartesian coordinates in either 2D (x and y) or 3D (x, y, and z) of a sensed environment. For example, a Point Cloud data set of a room, in its simplest form, might be a set of coordinates for points along walls, ceiling, and floor. When visualized in a 3D viewer or 3D plot, a person would recognize the Point Cloud data as being a room. In this example, the points may be clustered sufficiently close to see details such as door edges, windows, etc. In a 2D Point Cloud, all of the points appear in one plane, regardless of how it is viewed.

Global Point Cloud refers to a set of points that have been rotated and transformed into a single global frame of reference. Depending on the context, Global Point Cloud may refer to the points from a single laser scan or the points of many laser scans.

An Inertial Measurement Unit (IMU) refers to a device comprising sensors that measure movement by sensing acceleration and rotation. Non-limiting examples of IMUS include: a 3 DOF (Degrees of Freedom) sensor that senses linear acceleration or angular acceleration or a gravitational vector; a 6 DOF sensor sensing 3 degrees of linear acceleration and 3 degrees of angular acceleration; and A 9 DOF IMU that additionally includes a magnetometer sensor that measures the gravity vector and references magnetic North.

Post Processing refers to process that are accomplished after data collection takes place.

Real-Time (RT) refers to a method of program or process execution where all of the steps in the process proceed in such a way that data is processed continuously and as data is input. There is no effective delay or storage of data to be processed but instead, is acted on immediately upon arrival to its logical conclusion or data in its final form.

Registration refers to a process of rotating and translating an individual laser scan from a sensor frame of reference to a global frame of reference, which is a fixed frame of reference for the 2D or 3D inertial frame in which all points are represented. A global pose is used to transform (i.e. rotate and translate) laser scan Cartesian data in Sensor Frame into a global frame.

Sensor Frame of reference refers to the frame of reference in which a sensor measurement is read.

Off-line refers to performing data processing without the use of a mobile unit, but instead using pre-recorded data.

On-line refers to performing data processing while using the mobile unit to collect data and in real-time. During on-line operation, data may be recorded and saved in files for later off-line processing.

Merged 3D Point Cloud in Global Frame refers to the result of merging all 3D Laser Scan Point Clouds in a Global Frame into one data set. All registered laser scans appear in one single data set representing scans within a time range.

FIG. 1 is a block diagram of one embodiment of a data collection and point cloud generation system 30 according to the invention. The system 30 comprises a computing device 32 and a mobile unit 10. The computing device 32 communicates with the mobile unit 10 via a network 31 or any other type of device or method for transferring data from the mobile unit 10 to the computing device 32. In one embodiment, for example, a memory stick (not shown) may be used to manually transfer data collected by the mobile unit 10 to the computing device 32. The network 31 may be any type of network that enables the computing device 32 to communicate with the mobile unit 10. As an example, the network 31 may be a wireless local area network (WLAN or WiFi), and the computing device 32 may communicate with the mobile unit 10 via wireless transceivers (not shown). FIG. 1 shows the computing device being separate from the mobile unit 10. In an alternative embodiment, the computing device 32 may be incorporated into the mobile unit.

The mobile unit 10 comprises a range-finding laser device (RFLD) 9 and an Attitude inertial measurement unit (IMU) 8 fixed to the RFLD. A mobile computing device 11 communicates with the RFLD 9, the IMU 8, a display device 2, an input device 3, and a zero velocity update (zupt) IMU 6. The mobile unit preferably comprises a second zupt IMU 7. A power device 12 may provide power for all power consuming components of the mobile unit 10 as shown or one or more power consuming components may additionally or alternatively be powered by additional power devices 12. The power device 12 may comprise, for example, a battery, a fuel cell, and/or an another source of electrical power. The mobile unit may optionally comprise a camera 29 in communication with the mobile computing device 11. The listed components are exemplary components and additional or fewer components may be used in other embodiments to effectuate functionality of the system 30, to add functionality to the system 30, or to limit functionality of the system 30.

The display device 2 provides a rendering of a point cloud generated using data collected during operation. The input device 3 may be any device allowing an operator to provide input to the mobile computing device 11. In a preferred embodiment, the input device 3 is a keyboard. In another preferred embodiment, the input device 3 comprises a microphone and headphones for inputting voice commands and listening to prompts to the operator.

In a preferred embodiment, the RFLD 9 employs a LIDAR (light detection and ranging) process and comprises a receiver 14 for receiving reflected light pulses. The RFLD 9 performs timed scans with data collected from each scan (scan data) from of a plurality of reflected pulses received from a nearby structure or feature. As an example, the laser may rotate about a center axis and transmit and receive 1081 pulses during a scan, which sweeps 270°. In this regard, the first pulse in the scan is at index 1, and between the first pulse and the final pulse reflection receipt at index 1081, the laser has rotated 270° and collected scan data used to calculate the distances of points on surrounding objects within the field of view of the RFLD 9 from which pulses have reflected top the receiver.

As an example, the data collection and point cloud generation system 30 can collect scan data that is used to generate a point cloud showing the locations of walls and other structures and objects within a building. For example, an operator may don the mobile unit 10, and travel in and out of rooms in a building. As the operator travels in and out of the rooms, the RFLD 9 collects scan data comprising range data and angle data for each of many scans. By way of example, the RFLD 9 may have an opening allowing a scan sweep of 270° and emit a pulse and receive a reflection of the pulse every ¼°. Thus, a single scan by the RFLD 9 may comprise 1081 data points indicating time elapsed from emission to receipt of a pulse and the index of each data point in the scan indicates a relative angular displacement, which may be measured from a central axis of the laser. A RFLD may operate, for example, with a scan rate of 40 Hz so that a single scan takes only a fraction of a fraction of a second so the operator may move continuously through the building, allowing the interior to be mapped with a combined accuracy and short time when compared to existing technologies.

The attitude IMU 8 is fixed relative to the RFLD 9, for example, by a fixed attachment or fixed reversible coupling to the housing of the RFLD 9. The attitude IMU 8 collects inertial data measuring the yaw, pitch, and roll relative to the RFLD in the RFLD's frame of reference. The zupt IMU 6, and optionally zupt IMU 7, collect angular rate and linear acceleration data for one position on the operator or, more referably, a first zupt IMU 6 is coupled to one of the operator's feet and a second zupt IMU 7 is coupled to the other of the operator's feet so that the two zupt IMUS 6,7 collect angular rate and linear acceleration data for both feet of the operator. In this embodiment, the zupt IMUS 6 and 7 calculate foot position, yaw, and velocity for both of the operator's feet and may provide a more accurate measurement of the yaw of the RFLD 9 than the attitude IMU 8. This also provides a redundancy with respect to tracking the position of the RFLD 9 as an operator moves.

The attitude measured by the attitude IMU 8, including the pitch, roll, and yaw of the RFLD are transmitted to the mobile computing device 11. Position, velocity, and yaw calculated by the zupt IMUS 6 and 7 and the range and angle measurements collected by the RFLD 9 are also transmitted to the mobile computing device 11. The mobile computing device 11 determines the estimated position and attitude of the RFLD 9 based upon the data received from a combination of the attitude IMU 8, the zupt IMUS 6 and 7, and the FRLD 9 (see FIG. 9). Once the estimated position and attitude are determined, the mobile computing device 11 generates a point cloud using the estimated position and attitude.

In one embodiment, the mobile computing device 11 may render in real time an image representing one particular scan and/or combined scan(s) during operation. The image may show, for example, outlines of walls, which are part of a layout for which the operator is collecting data with the system 30.

Point cloud data may be transmitted to and/or from computing device 32 via network 31 or another suitable transfer method. The computing device 32 may comprise additional imaging tools allowing a user to study, manipulate, and/or modify images generated from the point cloud. The computing device 32 may be a cloud-based computing device.

During operation, the data collection and point cloud generation system 30 may further collect video via the camera 29. The video may be time synchronized with the other components of the system 30, i.e., the RFLD 9 and the IMUS 6-8, such that subsequently the video may be used in conjunction with the collected data to provide additional information about particular characteristics of structures detected during operation. The camera is not necessary for point cloud generation or tracking the movement of the RFLD 9.

Figure 2A:
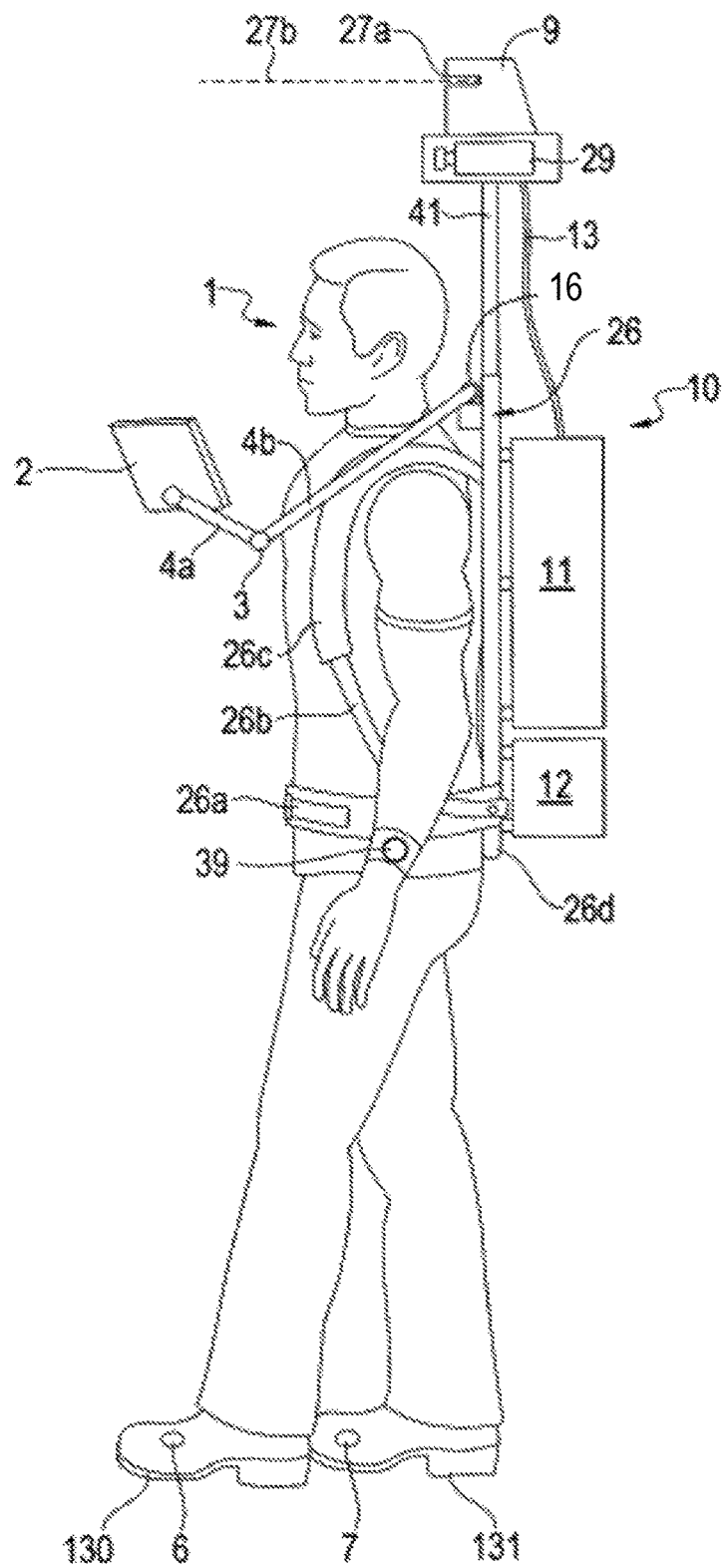
FIGS. 2 A-C depict an exemplary embodiment of a system according to the invention to be worn by an operator of the system.

FIGS. 2A-2C and 3 illustrate an exemplary mobile unit 10. FIG. 2A depicts an operator 1 wearing the mobile unit 10, which is removably affixed to the operator 1 via one or more straps 26a through 26c of a backpack apparatus 26. The backpack apparatus 26 also comprises a frame 26d on which components, such as the mobile computing device 11 and/or power device 12 can be mounted. A rigid frame fixed to the operator using multiple straps additionally contributes to a constant relative position between the operator 1 and the RFLD 9. The backpack apparatus 26 is one example of a structure that may be used to reversibly fix the mobile unit 10 to the operator 1 and provides the advantages of leaving the operator's hands free and relative comfort while collecting scan data for longer durations. Other structures may be used in other embodiments to removably affix the mobile unit 10 to the operator 1.

The mobile unit 10 shown in FIG. 2A comprises a cable 13 that communicatively couples the RFLD 9 to the mobile computing device 11. The attitude IMU 8 (FIG. 1) is fixed relative to a center point 27 a of the RFLD 9 and is also in communication with the mobile computing device 11 via cable 13. FIG. 2A depicts a line 27b that represents a center axis extending from the center point 27a, which is described further herein. While cables are described for the implementation of one embodiment of the present disclosure, other structures and/or methods may be used to communicate data from the RFLD 9 and the attitude IMU 8 to the mobile computing device 11. As an example, data may be communicated wirelessly.

The mobile unit 10 further comprises a display device 2, which may be configured as shown in FIG. 2A. The display device allows the operator to view point cloud data for a latest (current) scan and/or cumulative point cloud data for multiple scans. This allows the operator to see how well the scans have mapped an area and to adjust the operator's movements, if desired, to perform additional scans in an area or to move on more quickly, for example. Additionally or alternatively, the system 30 may comprise a wrist display device 39 communicatively coupled to the mobile computing device 11 such that images may be rendered to the wrist display device 39 representative of data collected during operation.

FIG. 2A shows the display device 2 adjustably affixed to the backpack apparatus 26 via an arm comprising a front member 4 a that is attached to a back member 4b via a joint 3. The joint 3 may implemented with degrees of freedom that allow the display device to be adjusted up/down, backward/forward, left/right, and/or rotated (or tilted) for ease of viewing by the operator 1. The first member 4a is coupled to the display device 2, and the second member 4b is coupled to the backpack frame 26d via a joint 16, which may also be implemented with degrees of freedom that allow the display device to be adjusted. FIG. 2A shows the zupt IMUS 6 and 7 fixedly coupled to the operator's shoes 130 and 131, which are worn on the operator's feet (not shown). Shoes, however, are not required and zupt IMUS 6 and 7 may be fixed directly to an operator's feet.

Figure 2B:
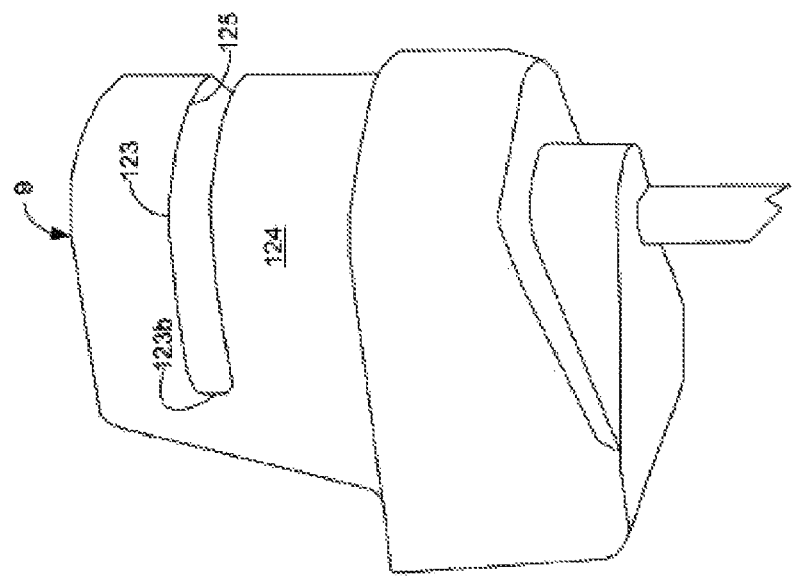
Figure 2C:
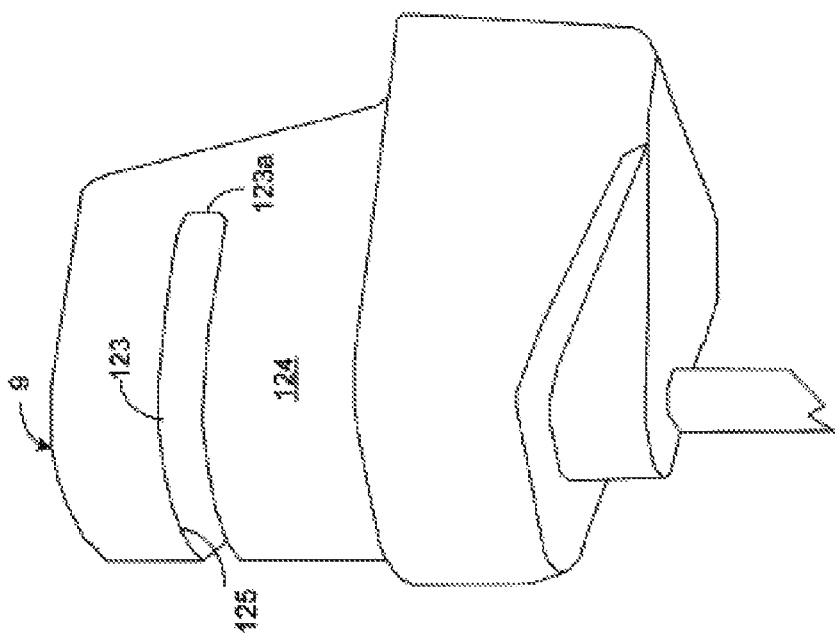

FIG. 2B depicts perspective view of a left side of the RFLD 9. In this embodiment, the RFLD 9 comprises a laser (not shown) contained within a housing 124 comprising an aperture 123 defined by an edge 125 of the housing. The laser contained in the housing 124 is situated such that its field of view aligns vertically with the aperture 123, and light emitted from the laser propagates through the aperture 123 out of the housing 124. During operation, the laser rotates 360° such that light propagates out of the housing through the aperture 123. During a single scan, light from the laser begins to propagate from the aperture at edge 123a and, as the laser continues to rotate, light propagates through aperture 123 until it rotates to edge 123b (shown in a perspective view of a right side of the RFLD 9 in FIG. 2C) of the aperture 123. Thus, the RFLD 9 can perform a 270° scan as it rotates.

Figure 3:
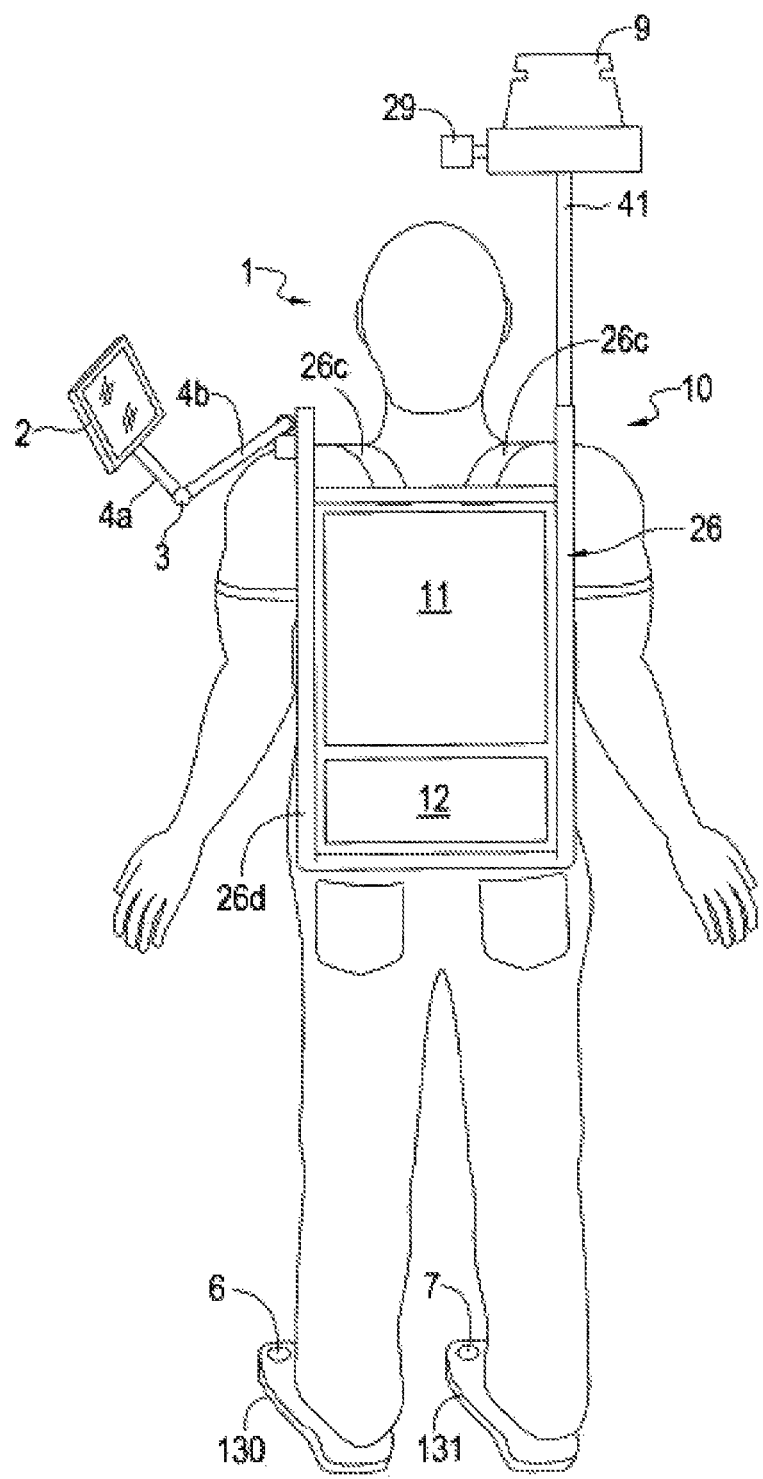
FIG. 3 depicts a perspective back side view of the system depicted in FIG. 2A.

FIG. 3 depicts a back view of the mobile unit 10 as worn by the operator 1. The RFLD 9 is coupled to an extending pole 41, which elevates the RFLD 9 vertically with respect to the remaining components in the mobile unit 10 and the operator. The extending pole may alternatively be directed forwardly, backwardly, or downwardly from the backpack structure 26, if desired, to obtain scans from a different perspective and/or to allow the operator to me in areas where there is not enough space above the operator to accommodate the RFLD 9.

Figure 4:
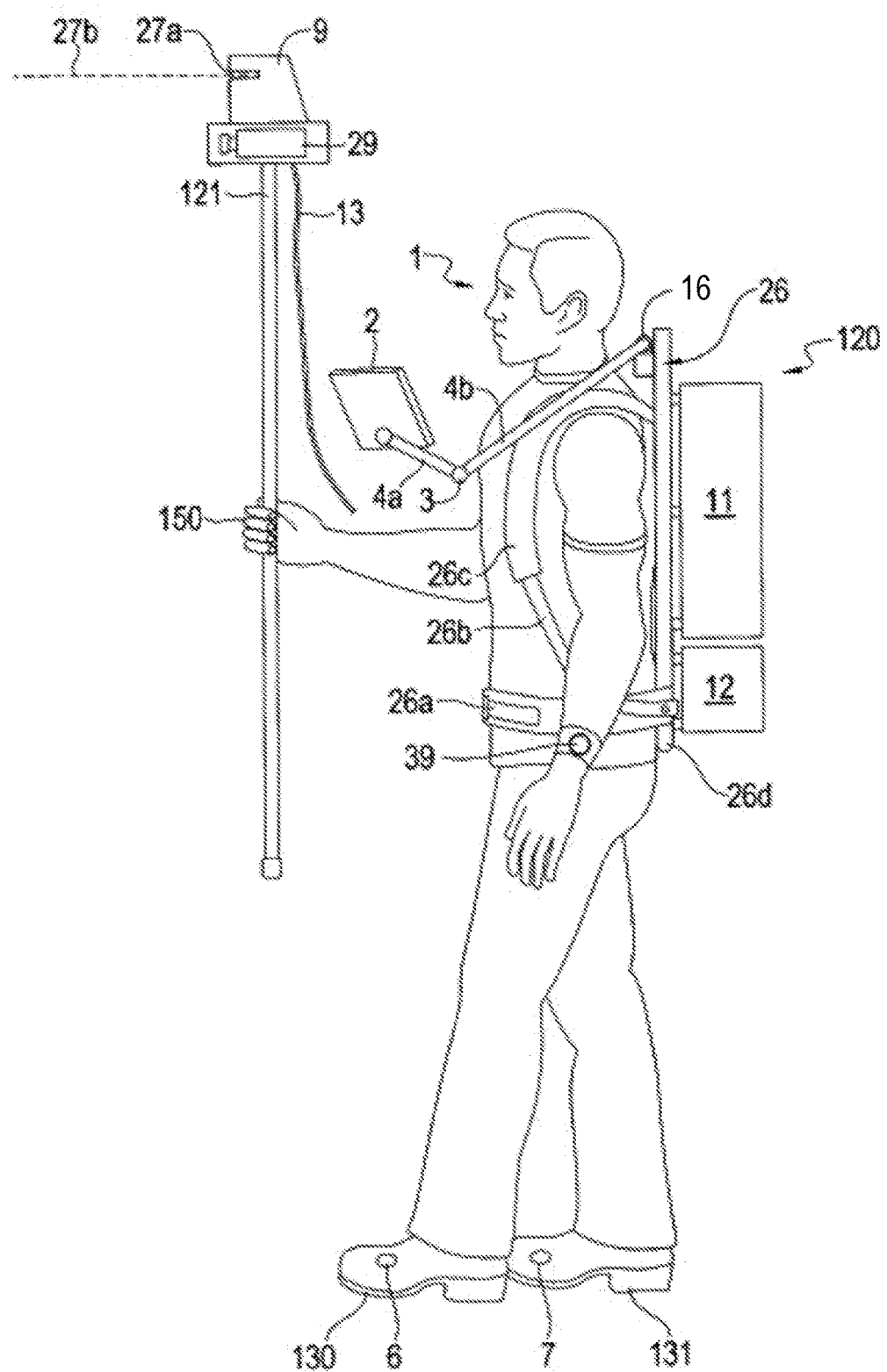
FIG. 4 depicts an exemplary embodiment of a system according to the invention to be carried by an operator of the system.

FIG. 4 illustrates an alternative mobile unit 120 in which the RFLD 9 is not coupled to the backpack frame 26d and comprises a pole 121 configured to be grasped by the hand 150 of the operator 1. The pole 121 may be, for example, an extendable or telescoping pole or a pole of fixed length. During the operation of this embodiment, the operator continues to grasp pole 121 and maintains the RFLD 9 in an elevated position as he/she traverses a building for which the operator is collecting scan data. This embodiment may be advantageous, for example, when relatively few scans are required and/or the space being scanned does not accommodate an embodiment as shown in FIG. 2A. The operator may tilt the pole 121 to change the pitch, roll, and/or yaw of the RFLD 9, which is measured by attitude IMU 8. The display device 2 may alternatively be attached to the pole 21 below the RFLD 9 instead of the backpack frame 26d. Using a hand-held embodiment, an operator moves around so that the scanner is able to scan interior environments, for example. The presence of pole 121 allows the operator to raise the RFLD 9 up high over obstacles, moving objects or people or lower the RFID enough to scan beneath obstacle and furniture. The hand-held unit is preferably made to be lightweight to prevent operator fatigue. The RFLD may comprise a housing with both a handle for the operator to hold the RFLD at waist level or to easily wave the scanner from side to side, up and down vertically, and even tilt up and down. The same housing may support the attachments of the pole 121.

Figure 5A:
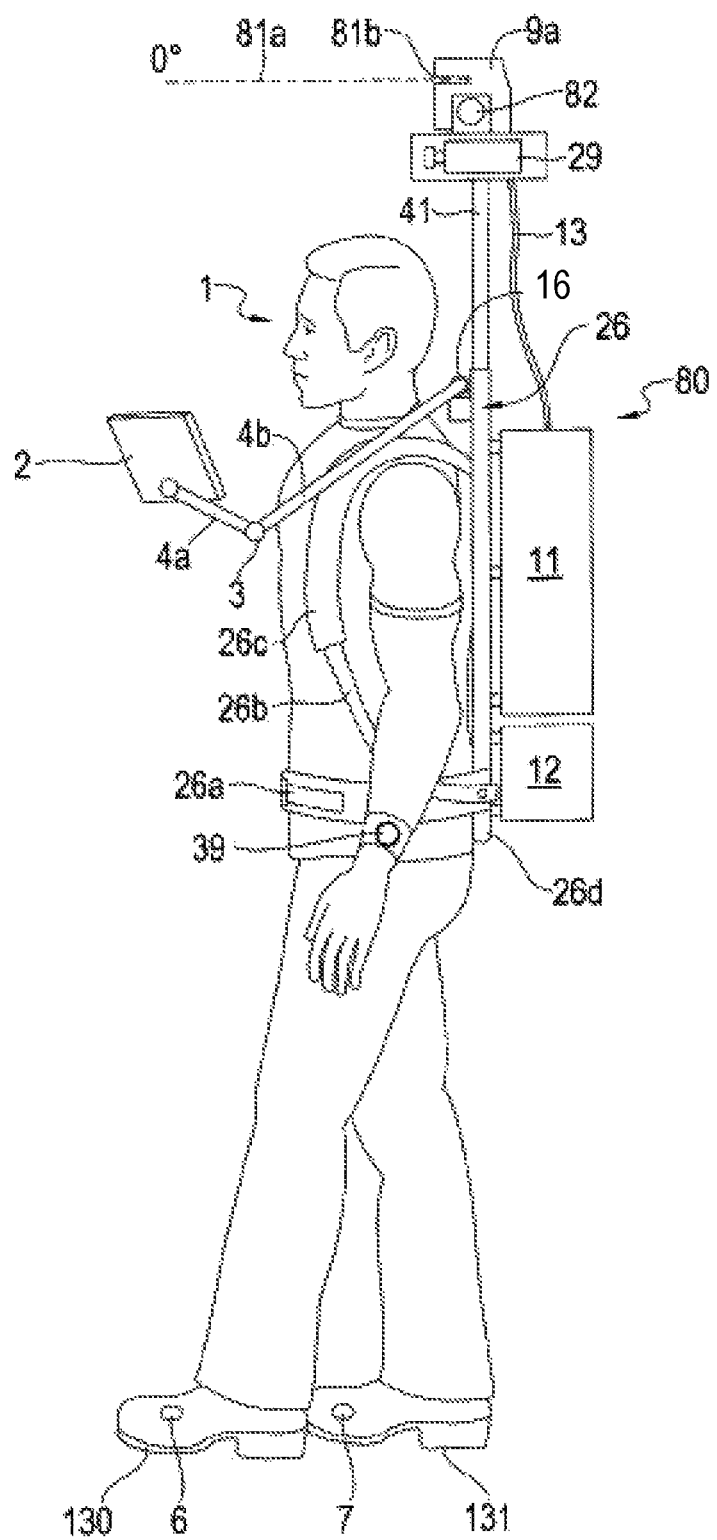
FIG. 5A is a side perspective view of an embodiment of a system according to the invention comprising a pitching range-finding laser device.
Figure 5E:
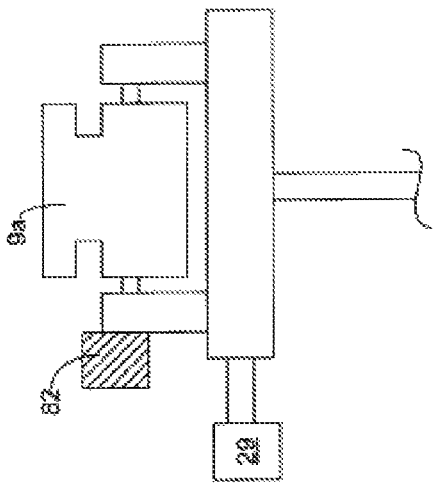
FIGS. 5B-E show side and back views of embodiments of a pitching range-finding laser device as shown in FIG. 5A pitching upward or downward at various angles.
Figure 5C:
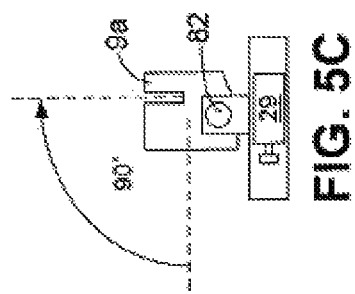
Figure 5B:
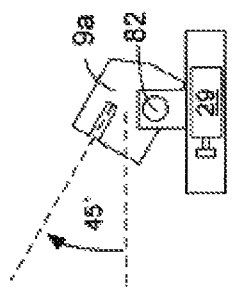
Figure 5D:
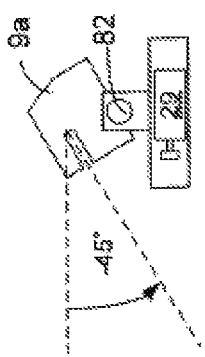

FIGS. 5A-5E illustrate yet another embodiment of a mobile unit 80 comprising a tilting mechanism that can change the pitch of a RFLD 9a. The mobile unit 80 is substantially similar to the mobile unit 10 depicted in FIG. 2A except FIG. 5A depicts a line 81a that represents a center axis extending from the center point 81b identified at 0°, which identified the pitch of the plane in which the laser pulses are emitted. The RFLD 9a comprises a motor 82, which when actuated, tilts the RFLD 9a, changing the pitch angle at which the RFLD 9a operates. When the RFLD 9a operates at 0°, the data collected is similar to that collected as described herein with reference to FIG. 2A. The change in pitch is measured by attitude IMU 8 and motor 82 may additionally communicate the pitch setting to mobile computing device 11. FIGS. 5B and C depict side views of the RFLD 9a when the RFLD 9a is tilted upward 45° and when the RFLD 9a is tilted upward 90°. FIG. 5D depicts a side view of the RFLD 9a when the RFLD 9a is tilted downward 45°. The tilting of the RFLD 9a may, alternatively or in addition to motor 82, be effectuated manually by the operator tilting the RFLD 9a.

As the RFLD 9a is pitched upward and downward as described, range and angle data may be measured and collected for structures and objects within the field of view of the RFLD 9a, e.g., data points located on an entire wall from ceiling to floor and/or data points on the ceiling and/or data points on the floor. Thus, in effect, data representative of a three-dimensional structure (and hence three-dimensional data) may be obtained via the mobile unit 80.

Figure 6:
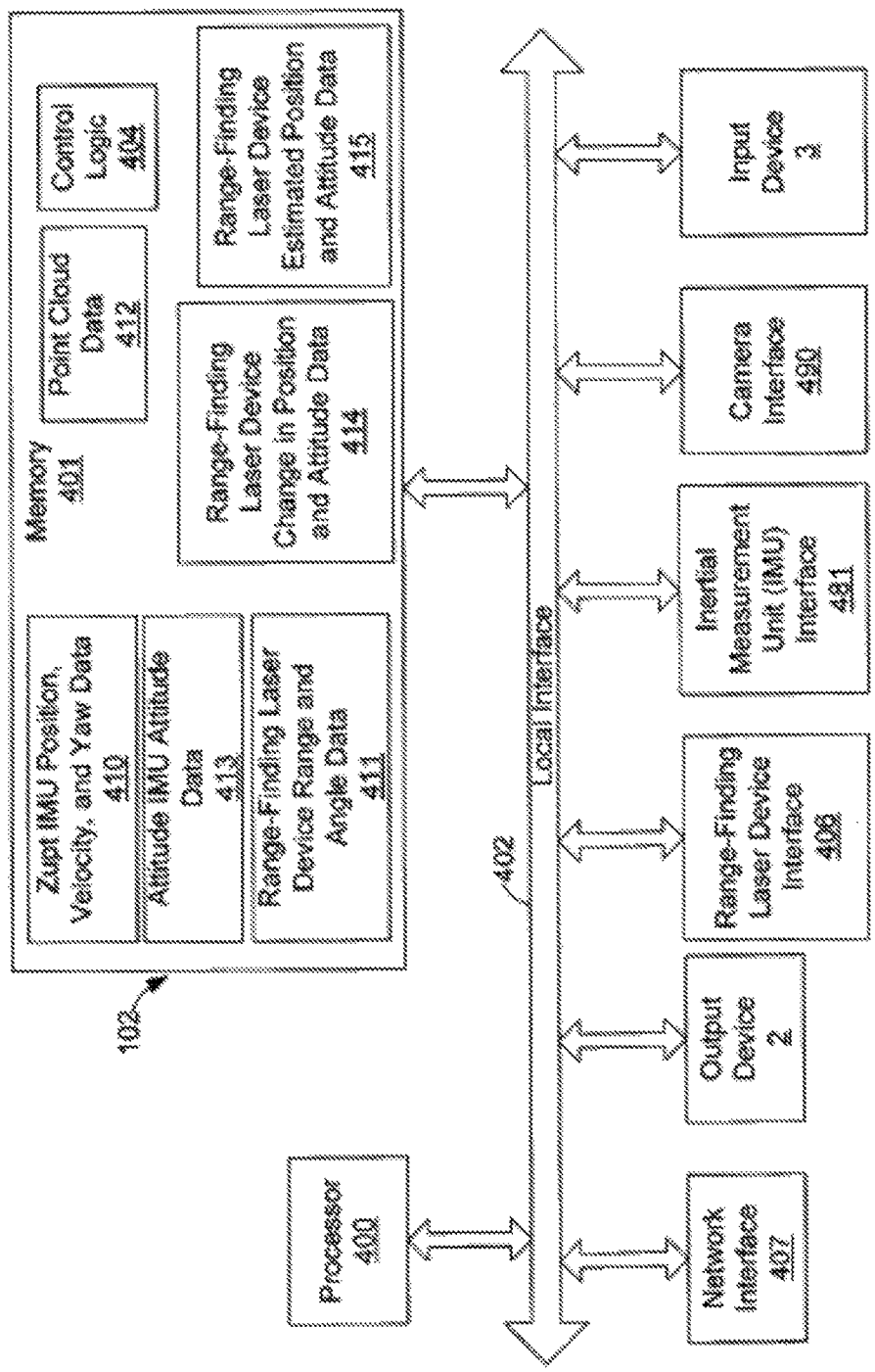
FIG. 6 is a block diagram illustrating components of a mobile computing device for a system as shown in FIG. 1.

FIG. 6 is a block diagram of an exemplary mobile computing device 11 comprising a processing unit 400, a network interface 407, a RFLD interface 406, an IMU interface 481, a display device 2, an input device 3, a camera interface 490, and memory 401. Each of these components communicates over a local interface 402, which can include one or more buses. Additionally, the mobile computing device 11 comprises control logic 404. The control logic 404 can be implemented in software, hardware, firmware or any combination thereof.

In the mobile computing device 11 shown in FIG. 6, control logic 404 is implemented in software and stored in memory 401, which may be, for example, random access memory (RAM), read-only memory (ROM), flash memory, or similar memory storage means. Processing unit 400 may be a digital processor or other type of circuitry configured to run the control logic 404 by processing and executing the instructions of the control logic 404. The processing unit 400 communicates to and drives the other elements within the mobile computing device 11 via the local interface 402, which can include one or more buses.

The network interface 407 may additionally support any type of communication device (e.g., a modem) that communicatively couples the mobile computing device 11 with a network 31 (FIG. 1). Further, the RFLD interface 406 and the IMU interface 481 may comprise any type of interface that communicatively couples the mobile computing device 11 with one or more of the RFLD 9 (FIG. 1) or 9a (FIG. 5A) and the IMUS 6-8 (FIG. 1). In this regard, the interfaces 406 and 481 receive data from the RFLD 9 or 9a and the IMUS 6-8 and translate the received data for processing by the control logic 404.

The camera interface 490 may be any type of interface known in the art for communicating with the camera 29 (FIG. 1) and may be embodied as software, hardware, or any combination thereof for communicatively connecting to the camera 29. The input device 3 is any type of input device known in the art for receiving input from the operator 1 (FIG. 2A) and may comprise, for example, a microphone (not shown), a keyboard (not shown), a touchscreen, or other type of human interface device that enables the operator to provide input to the mobile computing device 11.

During operation, the control logic 404 receives from the IMUS 6-8, via the IMU interface 481, zupt IMU position, velocity, and yaw data 410 (zupt IMUS 6 and 7) and attitude IMU attitude data 413 (attitude IMU 8). Upon receipt, the control logic 404 stores the data 410 and 413 in memory 401. The control logic 404 also receives from the RFLD 9 range and angle data 411 and stores the range and angle data 411 in memory 401. Upon receipt, the control logic 404 converts the latest range and angle data to Cartesian data and compares the latest (current) Cartesian data with the last (preceding) Cartesian data and derives a change in position and attitude based upon the comparison, which the control logic 404 stores as change in position and attitude data 414 in memory 401.

The control logic 404 processes the data 410, 414, and 413 to generate estimated position and attitude data 415 of the RFLD 9. The estimated position and attitude data 415 of the RFLD 9 is then used to transform scan data, derived from range-finding device range data 411, to a three-dimensional frame of reference so it can be added to the point cloud data 412. The point cloud data 412 is a collection of laser scan data over time and at any given moment, when displayed, is indicative of a layout of a structure that has been walked through in a global frame of reference. The control logic 404 may display an image generated from the point cloud data 412 to the display device 2. In one embodiment, the control logic 404 stores the point cloud data 412, which may at a subsequent time be transferred to the computing device 32 (FIG. 1) via the network interface 407 or by some other means, e.g., by transferring the point cloud data 412 to a removable memory device to which the point cloud data 412 is transferred, e.g., copied.

Figure 7:
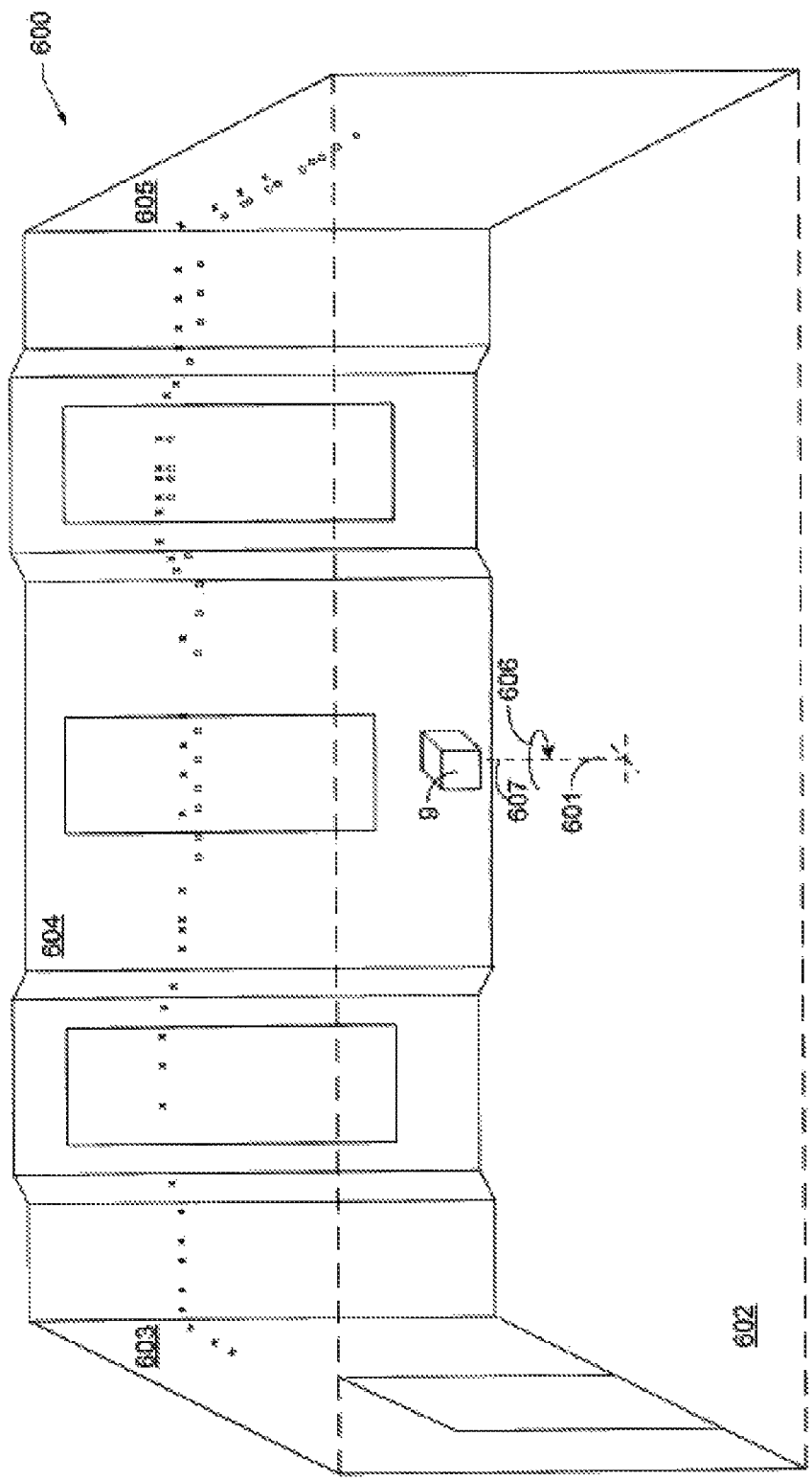
FIG. 7 is a perspective cross-sectional view of an interior of a structure to illustrate reflection points for laser scans by a RFLD at two different times and two different positions while gathering data.

FIG. 7 depicts a perspective cross-sectional view of a room 600 in which a RFLD 9, symbolized by a cube for simplicity, is located. The position symbol 601 indicates that the RFLD 9 is elevated from the floor 602 to simulate a position of the RFLD 9 when it is coupled to a backpack frame 26d (FIG. 2A) or coupled to a pole 121 and carried in an elevated position as depicted in FIG. 4 relative to the various walls 603-605 and the floor 602.

For purposes of discussion in explaining the data collection and point cloud generation system 30 (FIG. 1), assume that the RFLD 9 comprises the aperture 123 (FIG. 2B), and that the aperture 123, as described herein above, provides a particular field of view. Furthermore, the reference arrow 606 is shown to illustrate a 360° clockwise rotation about a central axis 607 of the laser (not shown) contained within the RFLD 9. Thus, as the laser rotates within the housing 124 (FIG. 2B), light emitted from the laser begins propagating outward toward the wall 603 (assuming that the side of the RFLD 9 is facing the wall 604) at edge 123a (FIG. 2B) of the aperture 123. The laser rotates and the last reading is taken at edge 123b (FIG. 2C) of the aperture 123. A set of data points corresponding to a single scan of the laser is hereinafter referred to as scan data. In the example provided, wherein the aperture 123 allows a 270° scan, the RFLD 9 determines time differentials (∆t) for each pulse emitted/received and calculates the distance traveled by the pulse, which indicates range (or distance) to the wall detected. In addition, the index of a particular data point in the scan data also provides angular information indicative of the angular offset of the laser beam (which may be relative to a central axis 27b (FIG. 2A) as it rotates. As an example, the RFLD 9 may collect a data point (i.e., a range data point) every ¼° in a 270° field of view, which means that approximately 1081 data points are collected for a scan. So as an example, the following represents scan data for a single scan (i.e., 270°):

Thus, for each set of scan data, there is range data indicating the range measured by the RFLD 9 and there is angular data indicating an angle difference

| Index | Angle Differential From Central Axis | Measured Range |
|---|---|---|
| 1 | ∠ = −135° | $Range_1$ |
| 2 | ∠ = −134.75° | $Range_2$ |
| . | . | . |
| . | . | . |
| . | . | . |
| 1080 | ∠ = 269.75° | $Range_{1080}$ |
| 1081 | ∠ = 270° | $Range_{1081}$ | between the central axis 27b and the position of the laser when the corresponding measurement was taken.

FIG. 7 comprises indicators including a set of "x" indicators and a set of "o" indicators, illustrating points on the walls 603-605 for which scan data is collected during two scans. The "x" indicators depict scan data from ScanA, and the "o" indicators depict data from ScanB. During operation, an operator 1 (FIG. 2A) traverses the room 600 either wearing the mobile unit 10 having the RFLD 9 (FIG. 2A) or RFLD 9a (FIG. 5A) or carrying the RFLD 9 (FIG. 4). The RFLD 9 or 9a collects scan data including the distance to each point located on the walls 603-605.

FIGS. 8A-8C further illustrate operation of the data collection and point cloud generation system 30 during collection of range and angle data 411 (FIG. 6) and processing of change in position and attitude data 414, attitude data 413, and position, velocity, and yaw data 410 in order to generate the point cloud data 412. The square symbol 701 represents the RFLD 9 and depicts a position (location A) of the RFLD 9 during a scan having a field of regard identified in FIG. 8A as ScanA and corresponding to the set of data points identified in FIG. 7 with the "x" identifiers. A laser sweep having the field of regard of ScanA produces a data set hereinafter identified as ScanN that comprises range and angle data for a single scan taken at time t1 having values associated with a plurality of data points corresponding to the "x" identifiers (FIG. 7).

FIG. 8B depicts an outline showing a graph of the data points contained in ScanN after processing by the mobile computing device 11. In location A, the RFLD 9 has an attitude (AttitudeA), which is measured by the attitude IMU 8 (FIG. 1). Thus, the mobile computing device 11 receives data indicative of AttitudeA from the attitude IMU 8. Note that AttitudeN comprises data indicative of roll, pitch, and yaw at the time (t1) when the measurement is taken by the attitude IMU 8 and that yaw may be omitted from attitude data for certain steps as described elsewhere herein.

In location A, the zupt IMUS 6 and 7 (FIG. 1) measure angle rates and linear acceleration, which are used to calculate position, velocity and yaw of the operator's feet (FIG. 2A) at a particular instant in time (t1). In one embodiment, the zupt IMUS 6 and 7 are coupled to shoes 130 (FIG. 2A) and 131 (FIG. 2A) of the operator 1 (FIG. 2A), which estimates but is not necessarily identical to the horizontal plane (x,y plane) position and velocity of the RFLD 9. An offset distance and direction between the RFLD 9 and the center of the operator's body may be measured or set. Data on the positions and attitudes of the operator's feet allow the body center of the operator to be calculated. This, together with the offset distance, allows data from the zupt IMUS 6,7 to be used for calculating the position of the RFLD 9. In one embodiment, calculation of position, velocity and yaw based on the measured angle rates and linear acceleration is performed by logic (not shown) resident on the zupt IMUS 6 and 7. Additionally or alternatively, such calculation may be performed by the mobile computing device 11 in other embodiments.

The square symbol 702 represents the RFLD 9 and depicts a location (location B) of the RFLD 9 during a scan having a field of regard identified in FIG. 8A as ScanB. The ScanB field of regard corresponds to the set of data points identified in FIG. 7 with the "o" identifiers after the RFLD 9 has been rotated to collect data for a different section of the walls 604 and 605. The scan having the field of regard of ScanB produces a data set ScanN+1 that comprises range and angle data for a single scan taken at time t2. FIG. 8C depicts an outline showing a graph of the data points contained in ScanN+1 after processing by the mobile computing device 11.

In location B, the RFLD 9 has an attitude (AttitudeB), which is measured by the attitude IMU 8 (FIG. 1). Thus, the mobile computing device 11 receives data indicative of AttitudeB from the attitude IMU 8 at a particular instant in time (t2). Further, in location B, the zupt IMUS 6 and 7 (FIG. 1) measure angle rates and linear acceleration, which are used to calculate position, velocity and yaw of the operator's feet (FIG. 2A) at a particular instant in time (t2). Control logic 404 calculates the operator's body center position and attitude based on the positions and attitudes of the operator's feet provided by zupt IMUS 6 and 7. Once the operator's body center position and attitude are determined, the control logic 404 adds the predetermined offset that has been measured or set between the operator's body center and the RFLD's center point.

In calculating a global pose of the RFLD 9, the mobile computing device 11 receives AttitudeN data from the attitude IMU 8, ScanN from RFLD 9, and position, velocity, and yaw from the zupt IMUS 6 and 7, taken at time t1. Additionally, the mobile computing device 11 receives AttitudeN data from the attitude IMU 8, ScanN+1 from RFLD 9, and position, velocity, and yaw from the zupt IMUS 6 and 7, taken at time t2. The control logic 404 calculates a change in attitude from t1 to t2. Such change is a calculated attitude difference between AttitudeB (at t2) and AttitudeA (at t1) referred to as "Delta Attitude." Further, the control logic 404 calculates a change in position from t1 to t2 derived from a difference between Location B (at t2) and Location A (at t1) referred to as "Delta Position."

The control logic 404 performs a variety of operations on the range and angle data 411 in order to calculate the estimated change in position and attitude data 414 needed to determine the global pose of the RFLD 9. Initially, the range and angle data 411 is measured in a spherical coordinate system from the RFLD's frame of reference. The control logic 404 converts the range and angle data to Cartesian coordinates in an X-Y plane (horizontal plane) thereby generating, for each data point in ScanN and ScanN+1,(x, y, 0) in the RFLD's frame of reference.

Using the latest computed pitch and roll from the attitude IMU 8, the control logic 404 converts the Cartesian coordinates (x, y, 0) of ScanN+1 to three-dimensional, noted as (x', y', z'). At this point in process, the three-dimensional coordinates (x', y', z') are also in the frame of reference of the RFLD 9. The control logic 404 then projects the three-dimensional coordinates onto a horizontal plane (not shown) by setting the z'-value of each data point to zero (0), noted as (x', y', 0). In the embodiment of mobile unit 80, the control logic 404 does not perform the projection onto a horizontal plane.

The control logic 404 then performs a scan matching method on ScanN data (i.e. last or previous, scan) and ScanN+1 data (i.e. latest or current scan) to produce an incremental scan matcher pose estimate for time t2. The control logic 404 compares data points contained in ScanN+1 with ScanN to determine a change in position and attitude, or incremental pose, which is indicative of Delta Position and Delta Attitude. The points from ScanN+1 are compared to points from ScanN 1 as clusters of points. via pattern matching. The algorithm determines not only the translation of the RFLD 9 but also its rotation. Due to the frequency of scans, only small changes in position and orientation occur even when the operator moves quickly. The result is an incremental pose estimate derived from scan matching techniques. Any type of scan matching techniques known in the art may be used and are not described in further detail here.

The control logic 404 then uses a filter to determine an estimated change in position and attitude, or incremental pose, of the RFLD 9 using a combination of the change in position and change in attitude calculated from two sources, which include the scan matching method and zupt process. In one embodiment, the control logic 404 employs an Extended Kalman Filter (EKF). The inputs to the EKF include the results of the scan matching method (difference between ScanN$_+$1 and ScanN) and the results of the zupt process. The result is a measure of incremental pose changes that are be used to update the latest global pose of the RFLD 9 for time t2.

The control logic 404 calculates a latest global pose, i.e., (x, y, z, roll, pitch, yaw) of the RFLD 9 based on the change in global pose by adding the latest change in global pose to the last global pose. The control logic 404 transforms the ScanN+1 for time t2 (i.e., ScanN data points) from the sensor frame of reference to the global frame of reference. The transform is performed using the Cartesian coordinates converted from the range and angle data 411 received from the RFLD 9. Techniques for performing transformations from sensor or local frames of reference to global frames of reference are known and are therefore not described in further detail here.

During the course of scanning structures and obtaining data indicative of the structures, there may be spurious data points that fall outside the prevalent general location of other data points, for example as a result of quick movements of the operator or a malfunction in equipment that may cause statistical outliers. In one embodiment of the system 30, the control logic 404 may perform a filtering method for removing such statistical outliers from the transformed ScanN+1 data before it is added to the point cloud data 412. Further, during course of operation, the operator 1 may hold the RFLD 9 still for a period of time and not physically move such that data obtained by the RFLD 9 becomes redundant. Thus, before adding transformed ScanN+1 data to the point cloud data 412, the control logic 404 may determine when the RFLD 9 was not moving, i.e., a period of non-movement of the operator, and eliminate redundant data during that period of non-movement thereby generating data hereinafter referred to as new transformed scan data.

The control logic 404 adds the new transformed scan data to the point cloud data 412 so that the point cloud data 412, after the addition, reflects the latest data points indicative of the structures scanned by the RFLD 9.

Figure 9:
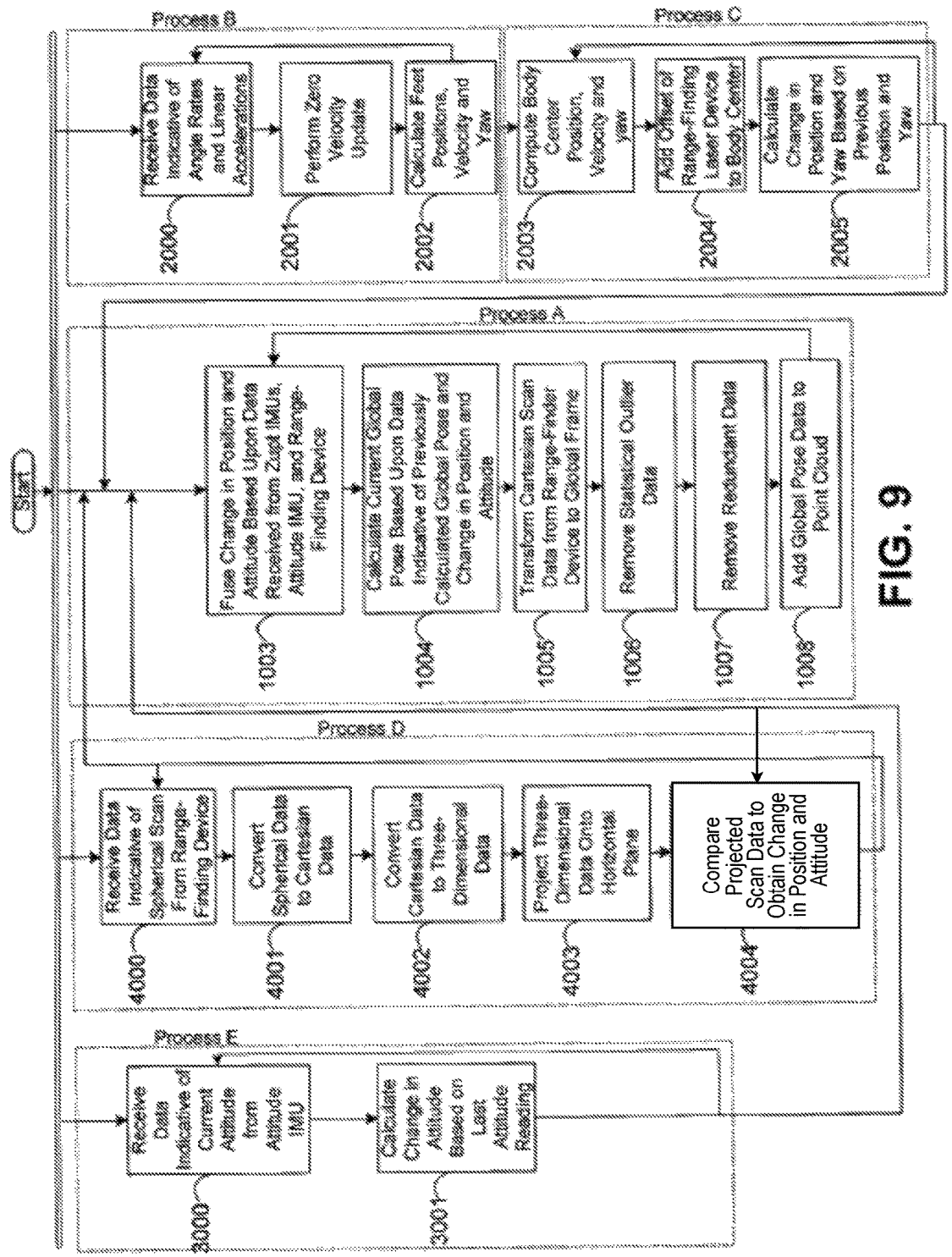
FIG. 9 is a flowchart illustrating an example of method for updating RFLD position and point cloud generation according to the present invention.

FIG. 9 is a flowchart depicting exemplary functionality of the control logic 404 (FIG. 6) in accordance with an embodiment of the present disclosure. FIG. 9 includes five processes, A, B, C, D, and E. The parent process that generates the point cloud data 412 (FIG. 6) is Process A, which receives data from processes C-E, and is used to generate the updated global pose of RFLD 9, 415, and point cloud data 412. Each of the processes B-E executes simultaneously during operation of the data collection for each range-finding laser scan and then, following execution of processes B-E, process A updates the global pose and adds new scan data to the point cloud data 412 for system 30.

Process B comprises three steps 2000-2002, which may be performed by the zupt IMUS 6 and 7 (FIG. 1) or, alternatively, may be performed by the control logic 404 of the mobile computing device 11. In step 2000, independent processors (not shown) of the zupt IMUS 6 and 7 receive data indicative of angle rates and linear accelerations of the foot to which each of zupt IMU 6 and 7 is attached. Such angle rates and linear accelerations relate to motion characteristics of the operator's feet as he/she moves or traverses an area being scanned. Upon receipt of the angle rates and linear accelerations, each processor performs a zero velocity update (zupt) in step 2001 in which zero velocity intervals are detected and any error contained in the measurements is reset or set to zero. In the particular system 30, zero velocity occurs when the operator's foot is at rest, which may be a short moment in time as the operator walks. In step 2002, the processor calculates the position and velocity of the operator's foot based upon the measured angle rates and linear accelerations received. In addition to position and velocity, the zupt IMUS 6 and 7 further provide data indicative of attitude. Once process B derives position, velocity, and yaw of the operator's feet, process B begins again at step 2000 so that process B is a continual process on each zupt IMU 6 and 7 that runs during operation of the system 30 such that position, velocity, and yaw data from the operator's feet are continually updated based upon movement of the operator.

Process C comprises three steps 2003-2005 performed by control logic 404. In step 2003, control logic 404 computes an estimated body center of the operator based upon the position, velocity, and yaw from each foot computed independently by the zupt IMU processors, 6 and 7, in step 2002. As shown in FIGS. 2A, 4, and 5A, the RFLD 9 or 9 a may be located at a particular position offset from the operator's body center while the system 30 is collecting data. To account for such offset, in step 2004, the control logic 404 augments the position, velocity, and yaw of step 2003 to account for the offset between the operator's body center and the RFLD 9 (FIG. 1) or 9a (FIG. 5A), resulting in the zupt IMUS' derived position, velocity, and yaw of the RFLD 9. Once position, velocity, and yaw data are derived for the RFLD 9 based on zupt IMU position, velocity, and yaw, control logic 404 calculates a difference between the latest derived position and yaw and the last derived position and yaw to determine an estimated change in position and yaw. Process C begins again at step 2003 so that process C is a recurring process that runs during operation of the system 30 such that the change in the RFLD's position and yaw is continually updated based upon movement of the operator and synchronized to each range-finding laser scan cycle (t).

Process D comprises five steps 4000-4004 performed by the control logic 404. In step 4000, control logic 404 receives spherical range and angle angle from the RFLD 9. In step 4001, the control logic 404 converts the range and angle spherical data to Cartesian data, i.e., each data point having a radial distance (the distance from the RFLD 9 to the walls) and an angle is converted to x, y coordinates represented (x, y, 0) in Cartesian notation. There is no z component considered in these coordinates because the RFLD 9 collects data in the x-y (horizontal) plane. In step 4002, the control logic 404 converts the Cartesian data points (x, y, 0) for each data point in the scan to three-dimensional data based pitch and roll data provided by the attitude IMU 8 (FIG. 1). This results in data hereinafter referred to as (x', y', z'), which is in the RFLD's frame of reference. In step 4003, the control logic 404 projects each three-dimensional data point onto a horizontal plane, i.e., the x-y horizontal field of regard of the RFLD 9. The result is data hereinafter are referred to as (x', y', 0)). Prior to performing the scan match process in step 4004, the laser scan reflections are adjusted for any tilt or roll of the RFLD 9. When the scanner is pointed down or up, the measured range is greater than at the horizontal and this must be corrected to avoid introducing error. To correct this problem, the scan points are rotated by the pitch and roll and then the z component of each point is set to zero to create a projection onto a horizontal plane. In the embodiment of the mobile unit 80 (FIG. 5A), step 4003 need not be used and the three-dimensional data (x', y', z') are used instead. In step 4004, the control logic 404 compares the latest scan data (i.e. ScanN+1 at t2) to the last scan data (i.e. ScanN at t1) using a scan matching method to obtain the change in position and attitude of the RFLD 9, or incremental scan matcher pose estimate (dX, dY, dZ) and (dYaw, dPitch, dRoll). This may be fused with the change in pitch and roll or attitude calculated in step 3001 to obtain a more accurate global pose. Scan data from ScanN+1 are compared to points from ScanN as clusters of points. Due to the frequency of scans coming, there will be only minor changes in movement reflected in the difference of the point patterns, even when the operator moves quickly. 17. The incremental scan matcher pose estimate for time t2 is added to the scan matcher pose estimate for time t1 to produce a pose estimate for time t2. Process D begins again at step 4000 so that process D is a recurring and iterative process that runs during operation of the system 30 such that the change in position is continually updated based upon movement of the RFLD 9.

Process E comprises steps 3000 and 3001 performed by the control logic 404. In step 3000, control logic 404 receives roll and pitch data from the attitude IMU 8. Yaw data may optionally be included but is not necessary in this embodiment. This attitude data is used in step 4002 of process D to convert the Cartesian coordinates to three-dimensional data. In step 3001, the control logic 404 calculates a change in pitch and roll using a difference between the latest attitude and the last attitude. Process E begins again at step 3000 so that process E is a recurring and iterative process that runs during operation of the system 30 such that the change in pitch and roll based upon the attitude IMU 8 is continually updated based upon movement of the operator and the RFLD 9. Calculated changes in yaw of the RFLD 9 may also be included but are not necessary.

Process A receives sets of data from processes C, D and optionally E. Process C provides data on change in position and attitude of the RFLD 9 using information obtained from the operator's feet. Process D provides data on change in position and attitude including pitch, roll, and yaw using information obtained from the UMU 8 and the comparison of scanned data. Process E may, in some embodiment, provide data indicative of change in pitch, roll, and yaw to step 1003.

In step 1003, the control logic 404 fuses dead reckoning data from process C with the incremental scan matcher pose estimate from process D to obtain a fused estimated change in position and attitude of the RFLD 9. Fusion may be accomplished using an extended Kalman filter (EKF). The result is a measure of incremental pose change that is used to update the global pose of the RFLD 9 in step 1004. In step 1004, the control logic 404 calculates a latest global pose of the RFLD 9, based upon the fused data by adding the fused change in estimated position and attitude to the last global pose. In step 1005, the control logic 404 uses the latest global pose to transform the latest scan Cartesian points from the RFLD's frame of reference to the global frame of reference by rotating and translating Cartesian scan data in sensor frame of reference to the 3D laser scan point cloud in the global frame using the new global pose estimate for time t2. This process is also known in the art as registration. In step 1006, the control logic 404 removes statistical outliers from the transformed scan data that lies in the global frame of reference. In step 1007, the control logic 404 performs a filter method that removes redundant scan data resulting from non-movement of the operator 1 during data collection. In this regard, when the operator does not move and the sensors, i.e., the RFLD 9, the zupt IMUS 6 and 7, and the attitude IMU 8, continue to collect measurements and perform calculations, redundant scan data will unnecessarily accumulate. Thus, in order to ensure that such redundant data does not unnecessarily appear in the point cloud data 412, the control logic 404 removes such redundant scan data and does not add that data to the point cloud. In step 1008, the control logic 404 merges the 3D laser scan point cloud in the global frame of reference for time t2 with the accumulated merged 3D point cloud data 412, if not removed by Step 1007. This collection of points represents the final point cloud that may, for example, undergo feature extraction and segmentation processes to extract floor plans in a CAD host tool or other post processing. Process A begins again at step 1003 so that process A is a recurring and iterative process that runs during operation of the system 30 such that point cloud data 412 is continually updated based upon movement of the RFLD 9 and collection of data.

FIG. 10 depicts an alternative embodiment of process D depicted in FIG. 9. In this embodiment, while collecting and processing data via the mobile unit 80, the RFLD 9a can vary in pitch, which means that z-measurements of scan data obtained from the RFLD 9a may be used to determine information relative to three-dimensional structures within the field of view of the RFLD 9 a. Thus, the embodiment of Process D depicted in FIG. 10 comprises only steps 4000, 4001, 4002, and 4004.

One important technical feature of the system and process involves steps 3001 to 4002, which provide data that allows a more accurate determination of changes in RFLD position in the horizontal X-Y plane relative to existing methods and systems. This process uses data from the zupt IMUS and scan data, which improves the accuracy of calculated changes in position compared to the use of sensors or scans alone.

Another important technical feature is that the scan matching process D provides a more accurate determination of changes in yaw than using data from the attitude IMU. The scan matching method compares two-dimensional projections of a current scan and a preceding scan to calculate how much the yaw of the RFLD has changed from the previous scan to the current scan.

During scanning operation, the display device 2 may be used to display the point cloud of the entire space scanned since the start and, optionally, additional statistical and status information. Seeing the point cloud on the touchscreen display helps the operator detect if there are missed areas before ending the scanning session. Scanning operation may begin, for example, by the operator selecting on-line or off-line mode of operation, as well what data, if any to record to disk. Once started, the operator moves through an interior space, for example, collecting laser range data. The scanning operation may be paused, restarted, or shutdown. Pausing forces the scanner to stop recording data. Restart causes the scanner to continue sensing and collecting data, without changing it's operation mode. Shutdown is performed to close all save files and power down electronic components. Data may be recorded at various levels of process or computation and may stored on an internal disk drive until off-loaded to removable media, such as CDROM, DVD, Flash-drive, or over network connection. During operation, the scanner device may display an image of the generated global point cloud for the convenience of the operator. Collected RFLD pose and laser range data and optional video and/or audio may be stored for post-processing on the device or on a separate workstation that runs post-processing tools.

During scanner operation, the IMU 8 may take inertial measurements via a serial interface that correlates to a single timestamp and comprising linear acceleration, angular acceleration, angular position. Linear and angular Acceleration may pre-filtered to eliminate noise. Angular Position may be measured, for example in radians, in one of or both of Quaternion and Euler pitch, yaw, and roll and may be pre-filtered, transformed, and numerically integrated from gyro and accelerometer sensors.

An IMU pose estimate time correlated to a laser scan may be derived from IMU angular and linear acceleration measurements to compute position, and from angular position (orientation). The computed position may be obtained, for example, from double numerical integration of a Cosine Transform Matrix aligned with linear acceleration vector.

The data input and processed from the RFLD 9 and IMUS 6-8 represent continuous sensor data which may be delivered in real-time and as it is collected. In their raw form, the scan and IMU pose may seem unrelated as would be a photo camera with a shutter that open while the camera is move around,. The resulting image would appear as a blur. Without proper processing of RFLD and IMU data, an analogous result would be obtained. In a first processing step, in the inputs from the RFLD and IMUs is correlated based on time. In a second step, successive laser scans are used to detect movement (i.e. scan match) of the RFLD to estimate a new RFLD pose. The pose that results from scan matching is in addition to and complements the IMU pose estimate derived directly from the inertial sensors. The overall, or Global, pose is formulated by combining both scan matching pose estimate and IMU pose estimates. The scan matcher pose may be susceptible to influence by moving objects or lack of features to match in the scanned environment. These conditions may contribute to error in the scan matcher pose. IMU measurements are steady and is less susceptible to bumps and loss in detection but IMU measurements are susceptible to errors building slowly over time. Using two complementary pose sources results in a Global pose that is significantly more accurate over the operating range of the scanner than any one source. This registration of laser scans can be done off-line as well.

In a method for operating the system to obtain data, the RFLD us used in on-line mode, with the RFLD, IMUs, and optionally a camera and/or a sound recorder engaged and writing all collected data into files. During the scanning process, the operator views the registered global point cloud on the display device so the operator can see what areas of the scanned space have been covered and what areas have not and to be able to adjust travel path and speed appropriately. Once the scanning process is complete, the operator may offload the data files for post processing. The post processing proceeds in a fashion very similar to the scanner process, except that instead of reading measurements from the RFLD and IMUs, the post process tools read from file.

Laser scan range data or scan data in the sensor frame of reference can be written to file only during an online scanning mode and provides the ability to run registration algorithms off-line. Cartesian laser scan point cloud data in the sensor reference frame can be written during an online scanning mode or during an off-line mode when the RFLD is not collecting data and provides the ability to run registration algorithms off-line. Global point cloud data in a global reference frame can be written during on-line or off-line modes of operation. Merged point cloud data in a global reference frame can be written during both on-line and off-line modes of operation.

The mobile computing device software is designed primarily for on-line mode of operation with the capability to operate in real-time so that scan data and IMU sensor data can be processed as it is received. In addition, the software provides the operator with an image display presented on the display device. The software may be written in C++, for example, and may run on the mobil computing device.

Post-Process software may be used to refine and improve on the scanned point cloud registration, which results in a better image for entering into a CAD platform tool environment. The post-process software can be executed within the mobile computing device or preferably on a workstation class computer such as computing device 32.

The Merged 3D Point Cloud in Global Frame can be saved to file for later retrieval and processing. The format is amenable to being converted to other formats, such as Autodesk Revit® and PCG.

The invention claimed is:

1. A system for creating an image of a layout of one or more structures in an interior of a building, said system comprising:
   a mobile range-finding laser device (RFLD) configured to be coupled to an operator and to perform scans, each scan measuring a plurality of data points comprising range and angle values relative to a current location of the range-finding laser device and said one or more structures in a field of view of the RFLD;
   an attitude inertial measurement unit (IMU) that is affixed to the range-finding laser device that measures an attitude of the RFLD;
   a first zero-velocity update (zupt) IMU configured to be coupled to the operator and to calculate a position, velocity, and yaw of the operator;

an image display device;
a computer in communication with the RFLD, the IMU, the first zupt and the image display device; and
a power supply providing power to one or more of the computer, the RFLD, the IMU, the first zupt, and the image display device
wherein said computer comprises logic configured to:
a) convert the plurality of data points for each scan to Cartesian data points,
b) compare the Cartesian data points for a current scan with Cartesian data points for a preceding scan to derive a first estimated change in position of the RFLD from a position of the preceding scan to a position of the current scan,
c) using data from the attitude IMU, calculate a change in pitch and roll of the RFLD for the current attitude relative to a pitch and roll of the RFLD for a preceding scan,
d) using the estimated position, velocity, and yaw data from the first zupt for the current scan and a predetermined offset between a center of the operator and a center of the RFLD, calculate a second estimated change in the position and attitude of the RFLD,
e) fuse the first estimated change in position, the second estimated change in position and the change in attitude to obtain-a fused change in position and attitude of the RFLD relative to a position and attitude of the RFLD for a preceding scan,
f) calculate a current global pose for the RFLD based upon the fused change in position and attitude RFLD in step e),
g) transform the plurality of data points from a sensor frame of reference to a global frame of reference for the current scan to obtain current transformed data points,
h) merge the current transformed data points with a point cloud comprising prior transformed data points from previous scans, and
i) display the current and prior transformed data points on the image display device to produce an image of said one or more structures in the field of view of the range-finding laser device.

2. The system of claim 1, wherein the logic is further configured to eliminate transformed data from the current scan redundant to prior-transformed data points from previous scans.

3. The system of claim 1, wherein the logic is further configured to eliminate current transformed data points that the logic determines to be statistical outliers.

4. The system of claim 1, further comprising a second zupt IMU in communication with the computer and wherein the first zupt IMU is configured to be coupled to a first foot of the operator and the second zupt IMU is configured to be coupled to a second foot of the operator and the first and second zupt IMUS are configured to estimate position, velocity, and yaw of the operator's feet.

5. The system of claim 1, further comprising a backpack apparatus, which is configured to carry the range-finding laser device and the IMU and to be worn by the operator.

6. The system of claim 5, wherein the power supply is attached to the backpack apparatus.

7. The system of claim 5, wherein-the computer is a mobile computing device coupled to the backpack apparatus.

8. The system of claim 5, wherein the display device is coupled to the backpack apparatus via an arm comprising at least one pivot to enable the operator to manually position the display device in a plurality of positions.

9. The system of claim 1, further comprising a computing device communicatively coupled to the mobile computing device for receiving point cloud data.

10. The system of claim 1, wherein the RFLD is coupled to an extendable pole configured to be held by the operator.

11. The system of claim 1, wherein the range-finding laser device comprises a motor which, when actuated, rotates the range-finding laser device to change the pitch at which the range-finding laser device operates.

12. The system of claim 1, further comprising a camera and wherein the logic is configured to capture video via the camera and correlate the captured video with the display of transformed data points.

13. The system of claim 1, wherein said display device is a wrist display device configured to be worn by the operator for displaying an image of the transformed data points.

14. A method, for creating an image of a layout of a structure, said method comprising:
a) performing a current scan measuring a plurality of current range and angle value data points relative to a current location of a range-finding laser device (RFLD) and a surrounding structure in a field of view of the RFLD;
b) measuring a current pitch and roll of the RFLD via an attitude inertial measurement unit (IMU) that is affixed to the RFLD to determine a current attitude of the RFLD;
c) estimating position, velocity, and yaw of an operator carrying the RFLD via a first zero-velocity update (zupt) IMU coupled to the operator;
d) converting each of the plurality of current range and angle value data points to Cartesian data points, thereby generating current scan data;
e) comparing the current scan data with scan data from a preceding scan to derive a first estimated change in position of the RFLD from the position of the RFLD during the preceding scan;
f) calculating a change in the attitude of the RFLD relative to an attitude of the RFLD during the preceding scan,
g) converting the estimated change in position-of the operator carrying the laser range-finding device to a second estimated change in the position of the RFLD relative to the preceding scan;
h) fusing the first estimated change in position, estimated change in attitude and the second estimated change in position of the RFLD to obtain a fused change in position and attitude of the RFLD relative to the preceding scan;
i) calculating a current global pose based upon the fused change in position and attitude of the RFLD relative to the preceding scan;
j) transforming the Cartesian coordinates of the current scan data points from a sensor frame of reference to a global frame of reference to obtain current transformed data points;
k) merging the current transformed data points with a point cloud comprising prior transformed data points resulting from previous scans;
l) displaying the current transformed data points on a visual display and
m) moving the RFLD and repeating a)-l) to produce an image of said layout of said structure.

15. The method of claim 14, further comprising eliminating redundant range-finding laser device scan data from the current transformed data points resulting from slow range-finding laser device movement between scans.

16. The method of claim 14, further comprising eliminating data points in the current transformed data points determined to be statistical outliers.

17. The method of claim 14, further comprising attaching the first zupt IMU to a first foot of the operator and attaching a second zupt IMU to a second foot of the operator and, in step g, estimating position, velocity, and yaw of the operator's feet using data from the first and second zupt IMUS.

18. The method of claim 14, further comprising transmitting point cloud data to a remote computing device.

19. The method of claim 14, further comprising capturing video via a camera and correlating the captured video with the displayed transformed data points.

20. The method of claim 14, wherein displaying the current transformed data points on a visual display comprises rendering an image in real time for each current scan, together with the transformed data points of prior scans, wherein the displayed image represents combined scans during operation.

* * * * *